(12) United States Patent
Lee et al.

(10) Patent No.: US 6,782,125 B2
(45) Date of Patent: Aug. 24, 2004

(54) CONTENT-BASED MULTIMEDIA RETRIEVAL METHOD

(75) Inventors: Jin Soo Lee, Seoul (KR); Hyeon Jun Kim, Seongnam (KR)

(73) Assignee: LG Electronics, Inc., Seoul (KR)

( * ) Notice: Subject to any disclaimer, the term of this patent is extended or adjusted under 35 U.S.C. 154(b) by 681 days.

(21) Appl. No.: 09/802,979

(22) Filed: Mar. 12, 2001

(65) Prior Publication Data

US 2001/0028739 A1 Oct. 11, 2001

(30) Foreign Application Priority Data

Mar. 13, 2000 (KR) ........................................ 2000-12546

(51) Int. Cl.$^7$ ................................................ G06K 9/00
(52) U.S. Cl. ........................ 382/162; 382/165; 382/168
(58) Field of Search ................................ 382/162, 164, 382/165, 168, 170, 305; 707/104.1

(56) References Cited

U.S. PATENT DOCUMENTS 6,373,979 B1 * 4/2002 Wang .......................... 382/165
6,564,263 B1 * 5/2003 Bergman et al. .......... 707/104.1
6,643,387 B1 * 11/2003 Sethuraman et al. ........ 382/173

* cited by examiner

*Primary Examiner*—Phuoc Tran
(74) *Attorney, Agent, or Firm*—Fleshner & Kim, LLP (57) ABSTRACT

Disclosed is a content-based multimedia data retrieval method. The method according to the present invention comprises the steps of extracting color distortion information from multimedia data, setting weight of color-based descriptors on the basis of the extracted color distortion information, and extracting a distortion sensitivity by differently applying the weight according to the color distortion information. The method according to the present invention can improve a multimedia data retrieval performance and solve a problem of color distortion due to a different illumination or characteristics of a device.

25 Claims, 7 Drawing Sheets

CONTENT-BASED MULTIMEDIA RETRIEVAL METHOD

BACKGROUND OF THE INVENTION

1. Field of the Invention

The present invention relates to a content-based multimedia retrieval method, and more particularly, to a content-based multimedia retrieval method, which retrieves multimedia data on the basis of color-based descriptors or texture-based descriptors.

2. Description of the Prior Art

Recently, active researches for a content-based multimedia retrieval are in progress.

In the content-based multimedia retrieval, a color-based descriptor such as a color histogram and a texture-based descriptor such as a texture histogram are mainly used as descriptors for retrieving the content-based multimedia data. The color-based descriptor is used as the most important information.

However, there is a disadvantage that the color-based descriptor may be easily distorted due to an illumination around image or characteristics of an image acquisition device. That is, although images are the same, if the images are obtained from different devices or the images illuminated by different lighting are obtained, people recognize the images as similar images, but an image analysis by a computer shows entirely different color information. It is called a distortion.

Because a multimedia data retrieval performance is deteriorated by the distortion, recently, researches for retrieving without an influence of the illumination are in progress.

In the meantime, conventional technology uses a retrieval method not considering color elements easily distorted by the illumination. Here, the color is expressed by several elements such as brightness, hue and chroma. Those are called color elements.

For example, in the conventional retrieval system, if a user wants to retrieve multimedia data regardless of brightness, the user retrieves data without using the brightness element out of the color elements (brightness, hue and chroma). If a user wants to retrieve multimedia data regardless of the illumination containing a specified hue, the user retrieves data without using the hue element.

However, the method for retrieving multimedia data regardless of the specified color elements (brightness, hue) can not help resulting in deterioration of an overall retrieval performance because it does not use given information and does not reflect the distortion of the color exactly.

As previously described, the conventional method has a problem that a performance of a retrieval system is generally deteriorated, because it retrieves multimedia data regardless of the illumination.

If there exists rules in the color distortion caused by the illumination or the characteristics of the device, it is possible to get a higher retrieval performance by analyzing and using the rules and taking a method for compensating the distortion suitable for the corresponding characteristics of each data.

Recently, researches for obtaining the optimum retrieval result by applying different weight to the descriptors used for content-based multimedia retrieval has been published.

The weight means an importance level of each descriptor or the elements of the descriptor. In retrieving multimedia data, higher weight is applied to the descriptor capable of more exactly retrieving.

The elements of the descriptors mean elements constituting the descriptor. For example, if the color histogram is the descriptor, histogram bins constituting the color histogram can be regarded as the elements of the descriptor.

The method for retrieving multimedia data by applying the high weight is expected to have a high retrieval performance theoretically, however, more effectively method for automatically obtaining the optimum weight has not yet been developed.

As described above, the conventional method for retrieving multimedia data regardless of a specified color element does not reflect color distortion information. Therefore, the conventional method has a problem resulting in deterioration of the overall retrieval performance.

SUMMARY OF THE INVENTION

Accordingly, the present invention is directed to a content-based multimedia retrieval method that substantially obviates one or more of the problems due to limitations and disadvantages of the related art.

To solve the above problems, an object of the present invention to provide a content-based multimedia data retrieval method, which is capable of increasing multimedia data retrieval performance by automatically extracting color distortion information of multimedia data and automatically setting weight to color-based descriptors on the basis of the extracted color distortion information.

It is another object of the present invention to provide a method for extracting color distortion information of multimedia data and a method for generating multimedia data containing the extracted color distortion information.

It is a further object of the present invention to provide a method for extracting a distortion sensitivity by differentially applying the weight according to the distortion sensitivity of a descriptor or elements of the descriptor.

To achieve the above objects, the present invention provides a content-based multimedia retrieval method, including the steps of: extracting color distortion information from multimedia data; setting weight of a descriptor used in the content-based multimedia retrieval using the extracted color distortion information; and retrieving multimedia data applying the weight.

To achieve the above object, in the content-based multimedia retrieval method, the weight is set as low as the color element has low chroma, considering a distortion sensitivity of the color element having low chroma is larger than that of the color element having high chroma. The weight is also set as low for the color element having the hue different from that of the color distortion information, considering the color region having the hue different from that of the color distortion information is largely distorted in hue.

To achieve another object, a color distortion information extracting method includes the steps of: dividing an image into partial regions of N×M; calculating, with respect to all divided partial regions, average hue values of pixels that their chroma is lower than a predetermined threshold for each partial region, and variance of hue values of pixels applied to the average hue values; and re-averaging the average hue values obtained in each partial region with respect to the partial regions in which the calculated variance is lower than the predetermined threshold.

To achieve a further object, in a content-based multimedia data retrieval using a descriptor such as a color histogram of image, a multimedia data information generating method, comprising the steps of: generating a descriptor group having one or more descriptors used in the multimedia data retrieval; and extracting color distortion information from the multimedia data, automatically setting weight of the descriptor group according to the extracted color distortion information, and generating color distortion information for retrieving the multimedia data.

To achieve a further object, a distortion sensitivity extracting method includes the steps of: calculating a similarity based on a descriptor or an element of the descriptor with respect to the same image data in a data sample group that a color distortion does not occur and in a data sample group that the color distortion occurs; obtaining an average value of the calculated similarities; and determining a distortion sensitivity in inverse proportion to the average similarity.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

The present invention will now be described in detail in connection with preferred embodiments referring to FIGS. 1 to 7, after conceptions and features of the present invention are described.

In preferred embodiments of the present invention, color histogram, region representative color information, texture histogram and region representative texture information are used as a descriptor.

Elements of descriptors of the color histogram and the texture histogram are bins constituting the above histograms, while an element of a descriptor of the region representative color is a representative color in each region.

When the color of image is distorted, the color distortion can be occurred due to an illumination (a1), characteristics of a device (a2), characteristics of an encoder (a3) and a color filter (a4). The color distortion will be described in more detail hereinafter.

The distortion by the illumination (a1) is the color distortion due to the illumination having a specific brightness and color. The distortion can be occurred in only a partial region of image or in the whole region of image.

The distortion by the characteristics of the device (a2) is a case where the image is distorted due to the characteristics of image acquisition device such as a digital camera. In this case, whole image is distorted. For example, even the same images may be generally shown in a green color or in a red color according to the digital camera used for photographing.

The distortion by the characteristics of the encoder (a3) may be occurred due to algorithm characteristics of the encoder for storing obtained image in a file format even though the same image acquisition device or an image acquisition device without having distortion is used.

The distortion by the color filter (a4) may be occurred by using the color filter when obtaining image from the image acquisition device such as the digital camera. Here, the color filter may be a function of the camera or a function that can be added when the user wants.

As previously described, the color distortion of image may be occurred on the grounds of (a1) to (a4), and it is considered that it is difficult to compensate the distortion by the illumination (a1) out of the distortions by (a1) to (a4).

However, because the distortion by the illumination (a1) partially distorts the image, not the whole image, the deterioration of the retrieval performance due to the distortion is not severe, compared with other distortions by (a2) to (a4).

Because a distortion pattern is shown similarly in the whole image when the whole image is distorted on different grounds of (a2) to (a4), the distortion information may be extracted by using the above characteristics. That is, if information of how much the image is distorted by what color could be obtained, it is possible to prevent the retrieval performance from deteriorating due to the color distortion by using the obtained information and the characteristics of the color distortion, which will be described hereinafter.

As described in the related art description section, various techniques for content-based retrieval using the descriptors such as the color histogram, the texture histogram or the likes have been provided. A degree that the descriptors used for the content-based retrieval are influenced by the color distortion is defined as distortion sensitivity.

As the distortion sensitivity of the descriptor is large, the degree influenced by the color distortion is severe, and thus the probability of error is increased when retrieving the multimedia retrieval.

Hereinafter, the characteristics of the descriptors will be described in more detail, classifying the characteristics as four cases of (b1) to (b4), as follows. Here, the color histogram, the region representative color information, the texture histogram and the region representative texture information are used as the descriptors.

(b1) The distortion sensitivity of the color-based descriptors (color histogram and region representative color information) is larger than that of the other descriptors (texture histogram and information of region representative texture).

Thus, when the color distortion is occurred, if image is retrieved using the color-based descriptors, the retrieval performance may be deteriorated largely.

(b2) Of the color-based descriptors, the descriptor depending on color information itself is large in the distortion sensitivity. For example, the color histogram of image shows a color distribution of pixels in the whole image, and it can be defined as the descriptor depending on the color itself containing only color information.

Thus, the descriptor depending on the color itself is difficult to use for image retrieval because of a great transformation of the color histogram when the color distortion is occurred. However, the region representative color information has relatively small distortion sensitivity.

The information of the region representative color is the color information obtained by dividing image into partial regions of N×M pieces and by expressing the representative color for each partial region. Here, if there does not exist the representative color in the divided regions, it will be defined as 'Undefined'.

Meanwhile, when a similarity is measured by using the region representative color information, the region representative colors in the same position are compared each other.

The similarity measurement using the region representative color information has a restriction that the similarity should be measured in the same region, besides the color itself.

Therefore, the region representative color information is not influenced in the 'Undefined' region even though the color distortion is occurred.

Moreover, if the region representative colors are the same but shown in different regions, the colors are not influenced by the distortion because the colors are not compared from the first. That is, the similarity of the region representative color information is increased only when the same colors are compared each other in the same region. Thus, even though the color is distorted, the influence by the distortion is reduced because the region representative color information uses additional information of the same region.

(b3) The color is expressed in the hue showing a relative comparative value of RGB (Red, Green and Blue), the chroma showing how near is the color to a solid color, and the brightness.

For example, a color space expressed in a computer generally uses the RGB, but the RGB color space deteriorates the multimedia data retrieval performance viewed in the light of the characteristics of the color space. Therefore, The RGB color space is converted and used into a HSV (Hue, Saturation and Value) color space consisting of an axis having a sense of the hue, chroma and brightness. That is, when the color distortion is occurred, the retrieval performance is deteriorated or improved according to how much are the hue, chroma and brightness changed. Here, the hue information is the most important element of the color elements (hue, chroma and brightness).

Therefore, if the color distortion information of the illumination causing the color distortion is exactly extracted and removed from the image, the color can be restored into an original color.

However, it is generally very difficult to exactly extract the color distortion information in all of the hue, chroma and brightness.

Therefore, in the present invention, a method for extracting the hue in the distortion color information will be provided and an intensity of the distortion color information will be obtained.

In case of using only the hue information of the distortion color, it is supposed that the chroma and the brightness of the distortion color are all predetermined constants.

If the original color is distorted by the distorted color having the specific hue, there is a peculiarity of the following distortion sensitivity.

For example, even the descriptors based on the same color have different distortion sensitivity in the use according to the chroma of the color. That is, if the chroma is low, the change of the hue due to the color distortion is more increased. Before demonstrating the above, a formula for calculating the hue, chroma and brightness is as follows:

---

Formula 1

Max = MAX (R, G, B)
Min = MIN (R, G, B)
(Hue = H):
if (max == min) H is not defined
else
{
    if (R==max)H = ((double) (G−B)/(double) (max−min));
    else
    {
        if (G==max) H = (2.0 + (double) (B−R)/(double) (max−min));
        else
        {
        if (B==max) H = (4.0 + (double) (R−G)/(double) (max−min));
        }
    }
}
$H^* = 60$;
If (H<0.0) H+ = 360;
}
(chroma)
chroma = max − min;
(brightness)
Brightness = (max + min)/2

---

Supposing that specific color distortion information has an influence, the extent of that the specific color distortion information distorts the original color by the elements (hue, chroma and brightness) is calculated using the formula 1 as follows. At this time, it is supposed that the color distortion information of a red color has an influence to the following color regions (color regions of 1 to 4).

Color distortion information RGB (50, 0, 0)
    Hue (0), Chroma (50), Brightness (25)
    Color region 1: RGB (0, 0, 0)
    Hue (colorlessness), Chroma (0), Brightness (0)
    Color region 2: RGB (200, 200, 200)
    Hue (colorlessness), Chroma (0), Brightness (200)
    Color region 3: RGB (150, 100, 100)
    Hue (0), Chroma (50), Brightness (125)
    Color region 4: RGB (100, 100, 150)
    Hue (240), Chroma (50), Brightness (125)

As described above, the transformed colors after distorted by the specific color distortion information every color and their hue, chroma and brightness are as follows.

Color region 1: RGB (50, 0, 0)
    Hue (0), Chroma (50), Brightness (25)
    Color region 2: RGB (250, 200, 200)
    Hue (0), Chroma (50), Brightness (225)
    Color region 3: RGB (200, 100, 100)
    Hue (0), Chroma (100), Brightness (150)
    Color region 4: RGB (150, 100, 150)
    Hue (300), Chroma (50), Brightness (125)

As you can see from the color regions 1 and 2, if the color regions have the same chroma, the change of the hue, chroma and brightness are uniform without regard to the brightness. That is, the color regions 1 and 2 have the same chroma(0) but differ in the brightness.

On the other side, after the color distortion, the changed extents of the hue, chroma and brightness are equal in both regions (color regions 1 and 2). Therefore, the important point is the change of the hue.

The hue is the most important element in the image retrieval and may have the greatest influence when being transformed by the color distortion.

For example, the color regions 1 and 2 of low chroma directly reflect the hue information of the color distortion information. Namely, when the color region is influenced by a red illumination, the hue is directly changed into the red color. It is a phenomenon occurred in the low chroma region without regard to dark or bright color.

For another example, even though the color region is influenced by the illumination of a very minute red color, a very low chroma region is directly changed into the red color in the hue. It will be easily seen through a formula for obtaining the hue using each element of the RGB. That is, the hue is determined by a relative ratio of the RGB elements. The reason is that the relative ratio of each element may be easily changed when new RGB elements are contained by the color distortion information, because an inclusion ratio of each element is lowered if the chroma is lowered.

The regions (color regions 3 and 4) of a relatively high chroma differ in the extent of hue change from one another according to the original hue.

(b4) Another feature of the distortion sensitivity that you can see from the above description is that the distorted extent of the original hue differs according to the hue. That is, the color region 3, which has the same hue as the color distortion information, is not changed in the hue.

On the other hand, the color region 4 has a blue color, but the hue is changed into a violet color by the color distortion information. That is, if the color has the hue similar to the hue of the color distortion information, the hue is little in distortion.

Furthermore, the information of the high distortion sensitivity may cause an inexact result of the multimedia data retrieval when the color distortion information is contained.

Thus, when multimedia data is retrieved, it is preferable that the color distortion information is retrieved in a relatively low weight to cause an exact retrieval result.

Meanwhile, as a method for setting weight of the descriptor using the characteristics of the distortion sensitivity, two ways, i.e., a weight compensation (c1, c2) of the descriptor according to the distortion sensitivity and a weight compensation (c3, c4) of the color element according to the distortion sensitivity may be considered.

The weight compensation (c1, c2) of the descriptor according to the distortion sensitivity is to set the weight of the descriptors used for retrieval according to the distortion sensitivity. The weight compensation (c1, c2) is divided into a weight compensation (c1) of the color information according to the distortion sensitivity and a weight compensation (c2) of the descriptor according to the distortion sensitivity.

First, in the weight compensation (c1) of the color information according to the distortion sensitivity, the descriptors are divided into a color-based descriptor group such as the color histogram and the region representative color information, etc., and another group, for example, the texture histogram and the region representative texture information. After that, when the color distortion information is contained, the color-based descriptor group is set in the relatively low weight.

At this time, the extent of that the weight of the descriptor corresponding to the color-based descriptor group is set relatively low, i.e., the extent of how low is the weight set differs according to a strength of the color distortion information. That is, the weight is set in proportion to the strength of the color distortion information. Here, a method for obtaining the strength of the color distortion information will be described later.

Second, the weight compensation (c2) of the descriptor according to the distortion sensitivity is to set the weight of the descriptor, which has the higher distortion sensitivity, out of the color-based descriptors used for the retrieval to be lower than the weight of the other descriptors. That is, even the descriptor group based on the same color is set differently in the weight of each descriptor based on the corresponding color according to the distortion sensitivity.

After that, in the preferred embodiment of the present invention, the color histogram and the region representative color information are used as the color-based descriptors. At this time, because the distortion sensitivity of the color histogram is larger than that of the region representative color information, the weight of the color histogram is set relatively low.

The weight compensation of the color elements (hue, chroma and brightness) according to the distortion sensitivity is set differently in the weight according to the distortion sensitivity transforming the hue by the color distortion information by the color elements.

The weight compensation of the color elements according to the distortion sensitivity is divided into a weight compensation (c3) of the color elements by the chroma and a weight compensation (c4) of the element of the descriptor by the hue. Like each bin of the color histogram, if the element of the color-based descriptor means a color, the element is called the color element.

First, the weight compensation (c3) of the color elements by the chroma is to set low weight since the color element, which has relatively lower chroma, out of the color elements used in the color-based descriptor is higher in the distortion sensitivity than the color element of high chroma.

Second, in the weight compensation (c4) of the element of the descriptor by the hue, the color region having the hue similar to the color distortion information is not changed in the hue, but the other color region is changed relatively large in the hue.

Therefore, in the weight compensation (c4) of the element of the descriptor by the hue, because the color region having the hue different from that of the color distortion information is larger in the color distortion, the color element having the hue different from that of the color distortion information is set in low weight.

The weight compensations (c1~c4) of four types are applied in proportion to the intensity of the color distortion information. That is, when the weight is set relatively high or low, if the intensity of the color distortion information is high, the weight is set to be higher.

The weight compensation on the basis of the above conception is expressed by a formula 2 as follows:

$$\text{New\_Weight} = \text{original\_Weight} + ((\text{average\_Sensibility} - \text{Sensibility}(i)) \times \text{Intensity})) \quad \text{Formula 2}$$

Wherein the new_Weight indicates a new weight renewed by weight compensation, the original_Weight indicates an original weight, and the average_Sensibility indicates an average distortion sensibility of all descriptors.

Moreover, the Sensibility (i) indicates the distortion sensibility of the ith descriptor, and the Intensity indicates the intensity of the color distortion information.

Meanwhile, the above formula 2 shows the weight compensation (weight application) of the descriptor, but the weight compensation of the element of the descriptor may be performed in the same way.

To compensate the weight in proportion to the intensity of the color distortion information, the intensity of the color distortion information must be automatically extracted. The intensity of the color distortion information may be extracted simultaneously with the extraction of the color distortion information.

Hereinafter, a method for extracting the color distortion information will be described in detail.

The method for extracting the color distortion information includes the steps: dividing image into partial regions of N×M pieces; obtaining an average hue values of pixels that their chroma is lower than a predetermined threshold for each divided region and a variance of hue values of the pixels participating in determination of the average hue values with respect to all partial regions; re-averaging the average hue values obtained in each region with respect to the regions satisfying a condition that the obtained variance does not exceed the predetermined threshold, and obtaining a variance of average hue values participating in the re-average; and designating a ratio that the regions participating in the re-average of the hue values and of which the variance does not exceed the predetermined threshold occupies in the whole image as an intensity of color distortion, and designating the re-averaged average hue values as the hue value of the color distortion information.

Through the method for extracting the color distortion information, the hue value and the intensity of the color distortion information may be extracted and compensate (set) the weights of the four types (c1~c4).

The all methods described above are to compensate the weight on the basis of the distortion sensitivity of the element of the descriptor, and the distortion sensitivity may be obtained by the following method from a sample group of multimedia data.

Namely, the distortion sensitivity may be obtained by measuring the similarity on the basis of the descriptor or the element of the descriptor corresponding to the same image data in the sample group, in which the color distortion does not occur, and the sample group, in which the color distortion occurs, and by averaging the measured similarity and setting the distortion sensitivity in inverse proportion to the averaged similarity.

Hereinafter, referring to FIGS. 1 to 7, features and conceptions of the present invention will be described in more detail.

Figure 1A:
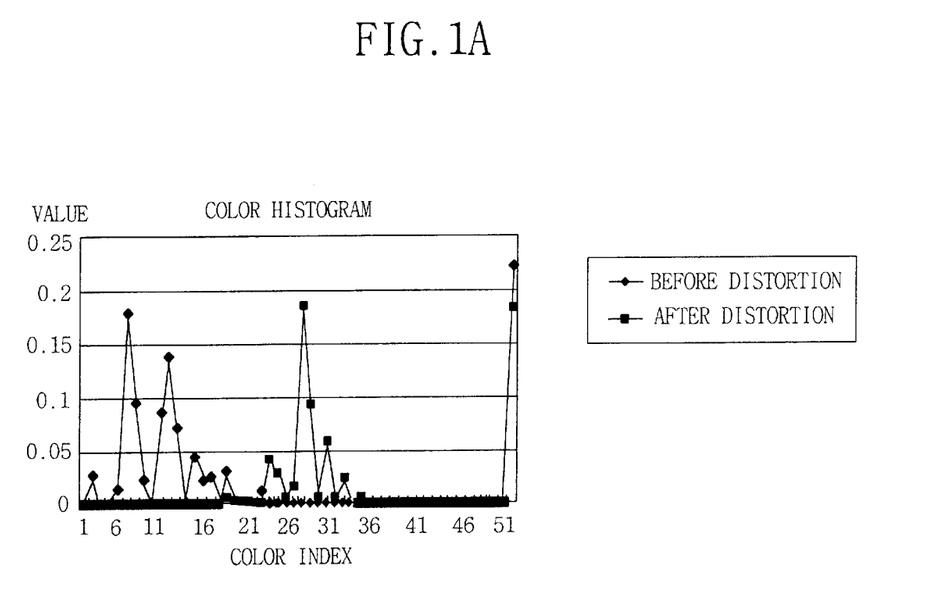
FIGS. 1A and 1B are views of histograms for comparing color feature information extracted from original image with color feature information extracted from image transformed by a specified illumination.
Figure 1B:
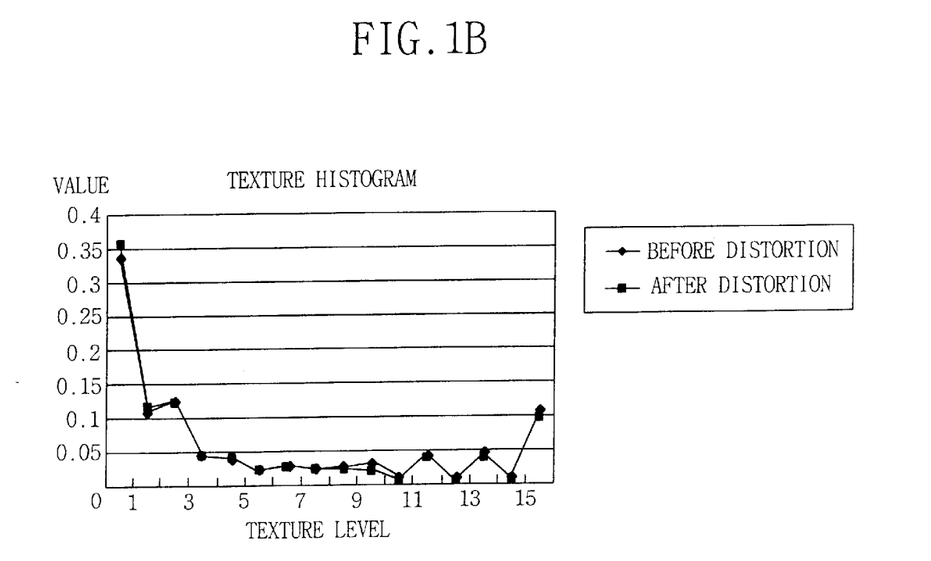

FIGS. 1A and 1B are views of histograms for comparing color feature information extracted from original image with color feature information extracted from image transformed by a specified illumination. That is, FIG. 1A is a view showing the color histogram and FIG. 1B is a view showing the texture histogram. Through graph of both histograms, the original color image information is distorted by an influence of the illumination.

As shown in FIG. 1A, the color information is shifted, i.e., distorted in a right direction by the atmospheric color such as the illumination. Thus, as previously described, the distorted color information causes the deterioration of the retrieval performance.

Because a reliability of the color information is lowered when the color of multimedia is distorted by the atmospheric color, other information besides the color must be considered as the important information to obtain an exact retrieval result.

FIG. 1B is a view showing a comparison of the text information extracted from the original image and that extracted from the image transformed by the illumination.

As you can see from graphs of FIGS. 1A and 1B, the text information does not largely transformed by the illumination, differently from the color information. Here, the reason that the text information does not largely transformed in comparison with the color information is that, in case of the color information, the color in itself is transformed by the illumination, but, in the text information, even though transformed, the color is not transformed by the illumination since the text information contains only pattern information of a relative difference of the color.

Because the information besides the color is not largely distorted by the atmospheric color, if the same information as the text is considered as more important information than the color information when multimedia data distorted by the atmospheric color is retrieved, an exact retrieval result may be obtained. That is, because information without being influenced by the illumination, such as the text, is more reliable when the color is transformed severely by the illumination, if multimedia data is retrieved in high weight to the information without being transformed by the illumination, the performance of a retrieval system may be improved.

Figure 2:
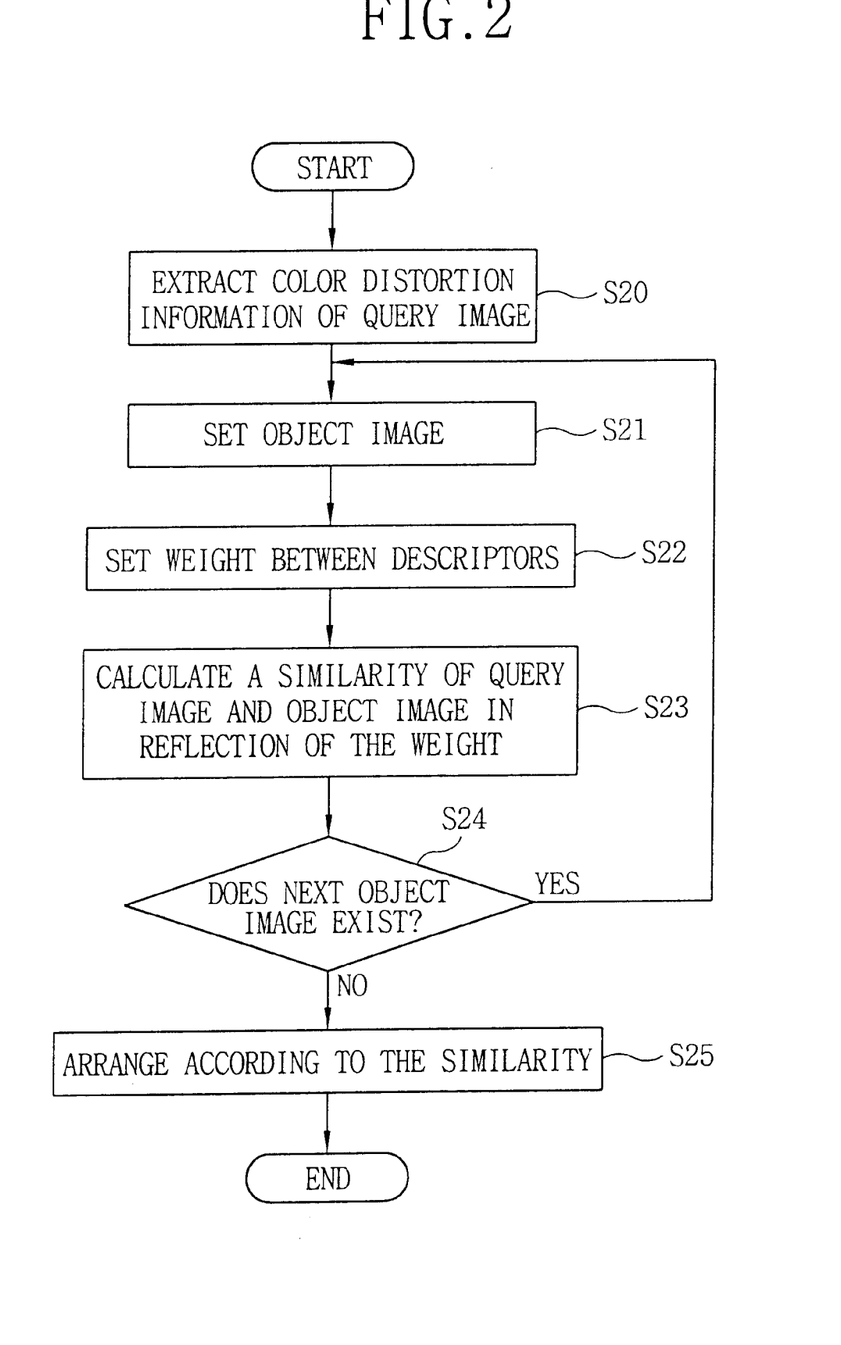
FIG. 2 is a flow chart of a content-based multimedia data retrieval method using the color distortion information according to a first preferred embodiment of the present invention.

FIG. 2 is a flow chart of a content-based multimedia data retrieval method using the color distortion information according to a first preferred embodiment of the present invention. The image retrieval will be described in more detail hereinafter.

First, the color distortion information of query image is extracted (Step S20). Here, the color distortion information may be extracted in a retrieval process of the multimedia data, but may be extracted in the step of extracting the descriptor such as the color histogram.

If the color distortion information is extracted in the descriptor extracting step, the color distortion information is used when the multimedia data is retrieved, after recorded as multimedia description information with the other descriptor (hue histogram).

After that, object image (image to be retrieved) to compare with the query image is selected. Here, the object image (image to be retrieved) is automatically set in a database of the retrieval object by a system (Step S21).

If the object image is selected, the color distortion information of the selected object image is extracted.

After that, weight between the descriptors used for the retrieval is set using the color distortion information of the query image and that of the object image (image to be retrieved) (Step S22). At this time, the weight may be set by extracting the color distortion information only from the query image, and may be set by extracting all color distortion information of the query image and of the object image and considering them.

In this embodiment, an example that the weight is set by extracting only the color distortion information of the query image is illustrated.

If the color distortion is severe, the weight between the descriptors is applied high to the descriptor. That is, it is to compensate the weight of the descriptor according to the distortion sensitivity. If the weight is applied, the similarity between the object image (image to be retrieved) and the query image is measured using the applied weight (Step S23).

The similarity between the object image (image to be retrieved) and the query image using the weight may be measured through the following formula 3.

$$\text{Similarity} = \frac{\sum_{i=1}^{n} sim(i) \times Wi}{n} \quad \text{Formula 3}$$

$$sim(i) = \text{maxDist} - (Vr(i) - Vt(i))^2$$

Wherein, the sim (i) indicates the similarity using an ith descriptor, the Wi indicates the weight of the ith descriptor, the maxDist indicates a maximum distance, the Vr (i) indicates an ith descriptor value (vector) of the query image, and Vt (i) indicates an ith descriptor value (vector) of the object image.

After that, when the similarity measurement is finished, it is determined whether or not the next object image (the next image to be retrieved) exists (Step S24).

If the next object image (the next image to be retrieved) exists, the next object image is selected and the above steps (S21 to S23) are performed repeatedly.

After that, if the above steps (S20 to S24) to all object images are finished, an arrangement step is performed.

In the arrangement step, the object images are arranged in higher order in the similarity on the basis of the measured similarity (Step S25), and thus the retrieval is finished.

As previously described, the weight compensation by descriptor is performed by the distortion sensitivity for setting the weight according to how much is the corresponding descriptor distorted by the color distortion information.

The weight compensation by the distortion sensitivity is divided into the following two cases.

The first is to set the weight of the descriptor as described above. Namely, like the color-based descriptors, the texture-based descriptors, etc., the descriptor groups are divided according to the type of information described by the descriptor, and the weight of the descriptor group of high distortion sensitivity is set relatively low by each group. In most cases, because being high in the distortion sensitivity, the color-based descriptors has relatively low weight if the color distortion information is contained.

The second is the weight compensation of the color-based descriptor by the distortion sensitivity, the weight compensation being performed by recognizing differently the distortion sensitivity even though the descriptor belongs to the descriptor group based on the same color and by setting the weight in detail according to the recognized distortion sensitivity.

Figure 3A:
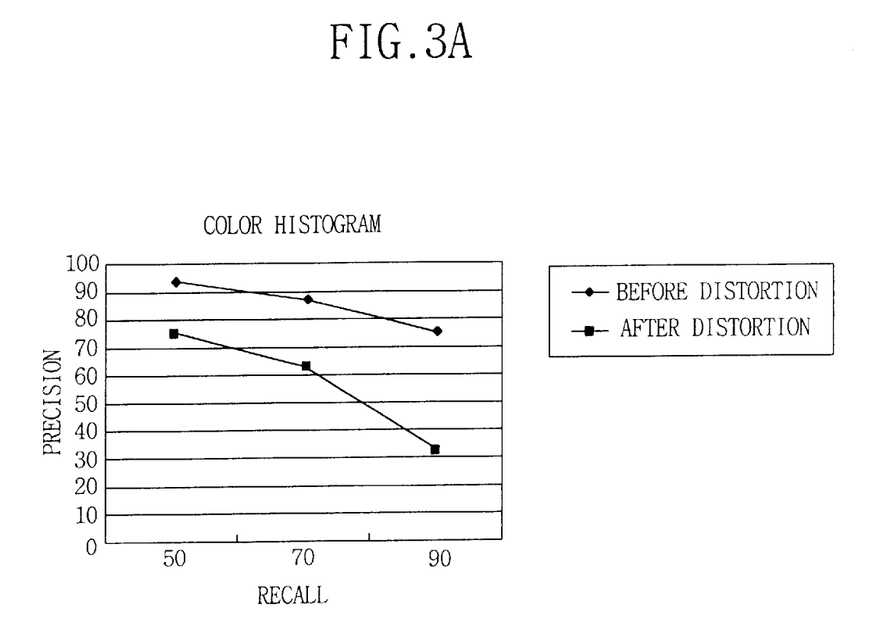
FIGS. 3A and 3B are views showing color histograms and region representative color information for comparing the colors before and after distortion.
Figure 3B:
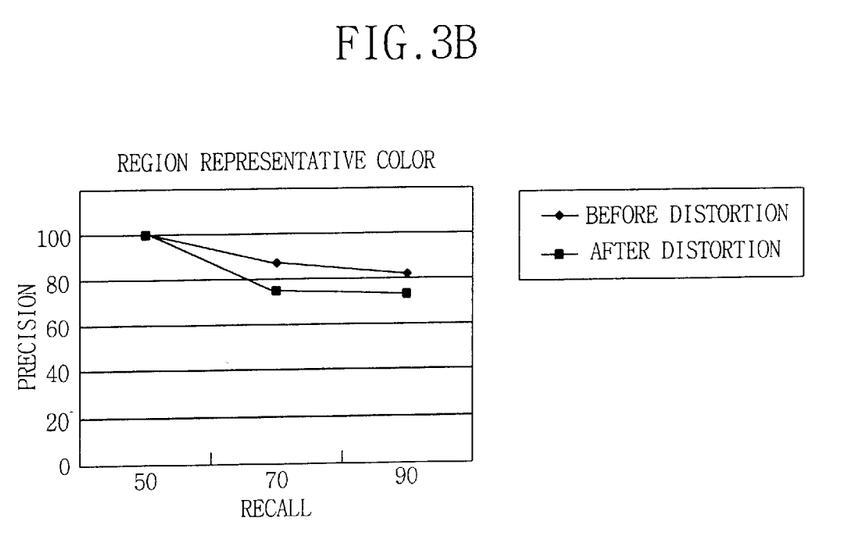

In the embodiment of the present invention, the color histogram and the region representative color information are used. In this case, the color histogram is larger in the distortion sensitivity than the region representative color information. Referring to FIGS. 3A and 3B, it will be described in more detail as follows.

FIGS. 3A and 3B are views showing color histograms and region representative color information for comparing the colors before and after distortion. Recall of a transverse axis indicates how many images shown are found through the retrieval, and Precision of a vertical axis indicates how exact images are contained in the shown images.

The color histogram of FIG. 3A is information showing the distribution of the color appeared in the pixels of image.

The region representative color information shown in FIG. 3b means that the image is divided into partial regions of M×N pieces and the representative color value, which can represent the corresponding region in each partial region, is expressed. That is, the region representative color information becomes the descriptor having representative color values of the M×N pieces every image.

Furthermore, FIGS. 3A and 3B show the performance deterioration of the system due to the color distortion information when the multimedia data is retrieved based on each descriptor.

As shown in FIG. 3A, when the multimedia data is retrieved based on the color histogram, the use of color distortion information is deteriorated more in the performance of the system than that of the region representative color information, and thereby the distortion sensitivity is increased.

Therefore, in case that the color distortion information is contained, relatively larger weight is applied to the region representative color information in comparison with the color histogram to improve the retrieval performance.

In this embodiment of the present invention, the color histogram, the region representative color information, the texture histogram and the region representative texture information are used, and the relationship of weight between the descriptors set when the color distortion occurs is as follows:

Relationship of Weight Between the Descriptors

> Texture histogram=region representative texture information>region representative color information>color histogram Hereinafter, referring to FIG. 4, a method for extracting the color distortion information will be described in detail.

Figure 4:
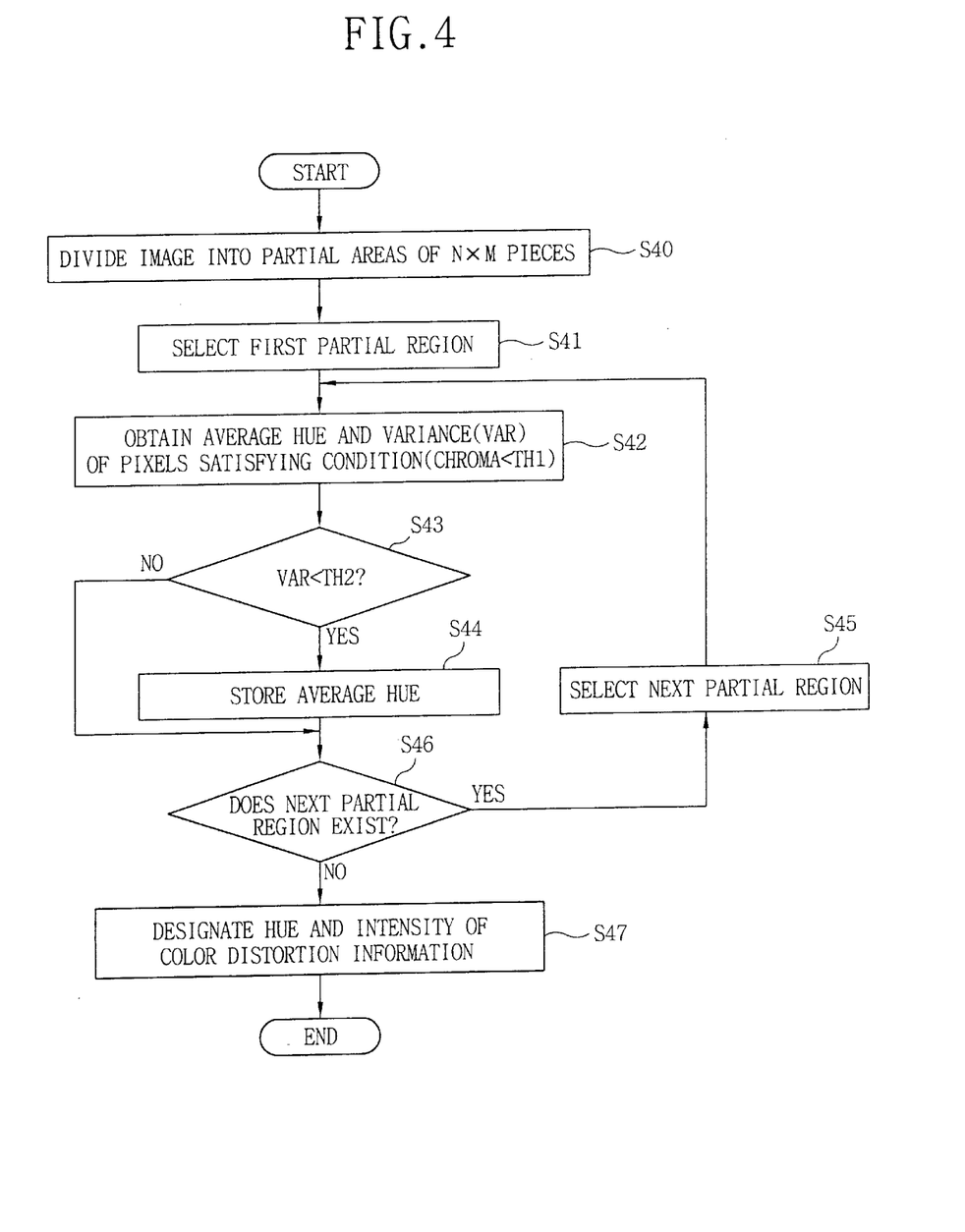
FIG. 4 is a flow chart of a method for extracting color distortion information.

FIG. 4 is a flow chart showing the method for extracting the color distortion information, and it will be described in detail as follows.

First, image is divided into partial regions (Grid) of N×M pieces (Step S40), a first partial region is selected from the divided partial regions (Step S41), and the hue of pixels lower a predetermined threshold (Th1) in the chroma is averaged (Step S42).

At the same time, the variance (Var) of the hue of the pixel applied to the average is calculated (Step S42). At this time, if the variance (Var) of the calculated hue is lower the predetermined threshold (Th2), the average hue is stored as a candidate of the color distortion information (Step S44).

On the other side, if the variance (Var) of the calculated hue is over the predetermined threshold (Th2), the next partial region is selected from the divided partial regions (Step S41) and the hue is averaged in connection with the selected partial region. The above steps (S42 to S44) for calculating the variance of the hue are performed repeatedly.

Therefore, in respect with all divided partial regions (Grid), the hues of the pixels below the predetermined threshold (Th1) are averaged by the chroma, and the variance (Var) of the hues of the averaged pixels is calculated.

After that, if the above steps (S40 to S46) are completed in connection with all divided partial regions, the stored average hues are re-averaged and calculated, and the final average hue becomes the hue of the color distortion information (Step S47).

The ratio that the number of the stored partial region (Grid) as the candidate of the color distortion information occupies the number of all divided partial regions becomes the intensity of the color distortion information (Step S47).

Therefore, as previously described, when the color distortion information is extracted, the intensity of the color distortion information can be obtained. In the present invention, when the weight is regulated by the color distortion information, the weight is regulated by reflecting intensity information of the color distortion information. For example, when the color distortion information is contained, the weight of the relative descriptor is in inverse proportion to the distortion sensitivity, and the weight compensation level is in proportion to the intensity of the color distortion information.

Figure 5:
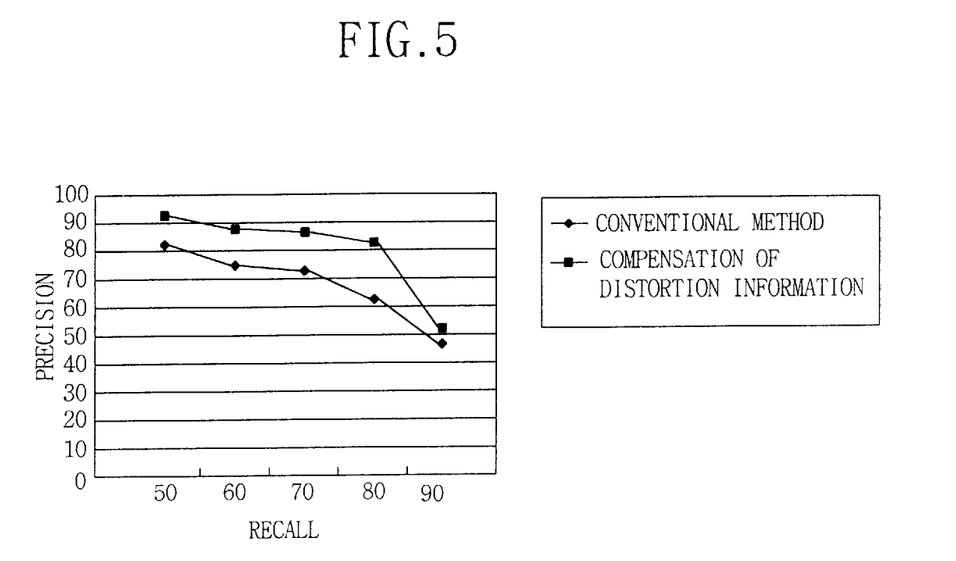
FIG. 5 is a graph showing a case of retrieval by automatically setting the weight of a descriptor based on the color distortion information and another case that the weight of the descriptor is not automatically set.

FIG. 5 is a graph showing a case of retrieval by automatically setting the weight of a descriptor based on the color distortion information and another case that the weight of the descriptor is not automatically set. That is, as the result that the retrieval is performed after automatically setting the weight of the descriptor on the basis of the color distortion information targeting the distorted image, the retrieval performance according to the present invention is improved to 40% or more in comparison with the conventional method. That is, when the multimedia data is retrieved according to the present invention, a retrieval error due to the color distortion can be reduced.

Figure 6:
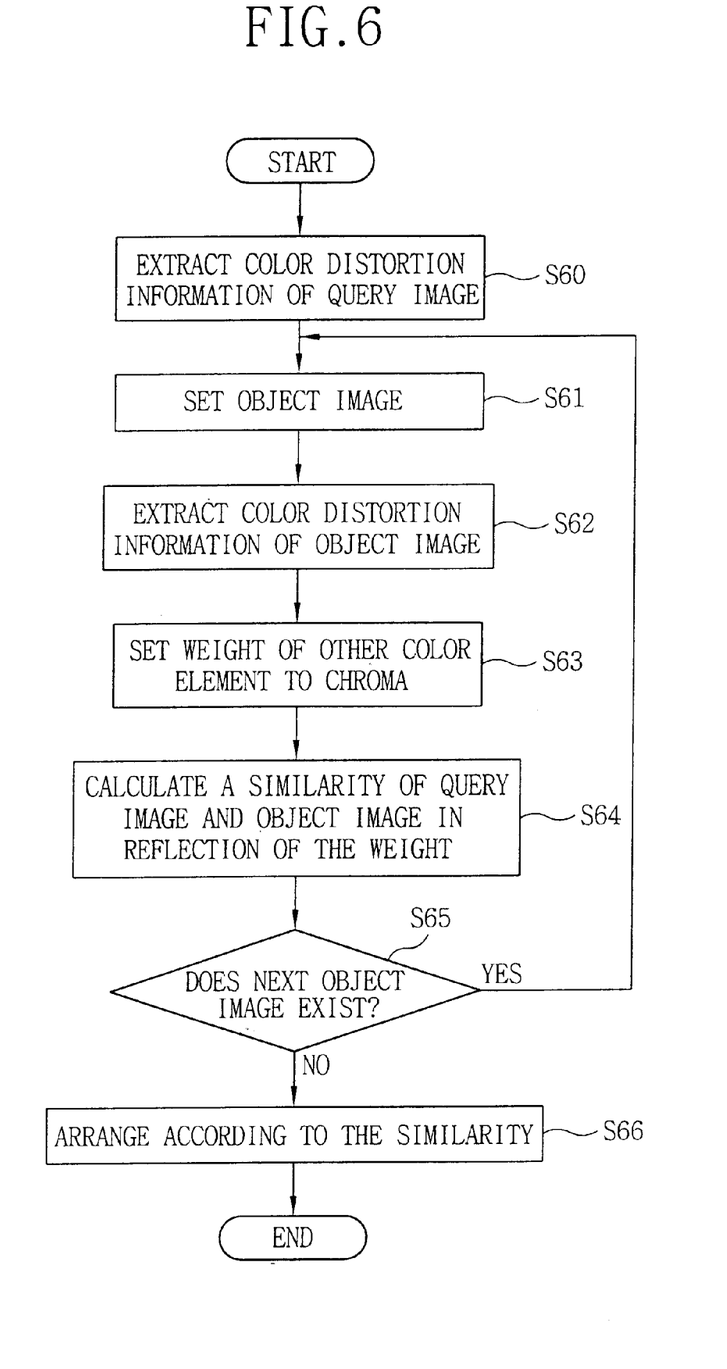
FIG. 6 is a flow chart of a content-based multimedia data retrieval method using color distortion information according to a second preferred embodiment of the present invention.

FIG. 6 is a flow chart showing the content-based multimedia retrieval method using the, color distortion information according to the second embodiment of the present invention, and it will be described in more detail as follows.

First, the color distortion information of the query image is extracted (Step S60). Here, the color distortion information may be extracted in the process for retrieving the multimedia data, but extracted simultaneously with the step of extracting the descriptor such as the color histogram.

If the color distortion information is extracted in the step of extracting the descriptor, the color distortion information is recorded as multimedia description information together with the other descriptor (color histogram) and used when the multimedia data is retrieved.

After that, object image (image to be retrieved) is selected to compare with the query image. Here, generally, the object image (image to be retrieved) is automatically set in the database of retrieval object by the system (Step S61).

If the object image is selected, the color distortion information of the selected object image is extracted (Step S62).

When the color information of the multimedia data is distorted by an influence of the illumination, the distorted extent differs according to the chroma of the color. For example, even though the colorlessness is distorted by the atmospheric color, people feel little difference, but feel relatively large difference in respect to the color, such as a white color, of low chroma.

Therefore, supposing that the lower the chroma is, the severer the distortion is, if the weight is set low, the retrieval error due to the distortion can be reduced. That is, the weight compensation of the color elements (hue, chroma and brightness) according to the chroma is performed (Step S63).

Also, the weight compensation of the color elements according to the hue may be performed.

The weight compensation of the color element is performed by the product of weight matrix when the similarity is measured after obtaining a difference between the color elements.

Generally, the color similarity is measured by Identity matrix of order I (=Ii) having a value 1 as shown in the following formula 4.

$$\begin{bmatrix} Diff(0) \\ Diff(1) \\ \vdots \\ Diff(i) \end{bmatrix} = \begin{bmatrix} 1 & 0 & \cdots & 0 \\ 0 & 1 & \cdots & 0 \\ \vdots & \vdots & \vdots & \vdots \\ 0 & 0 & \cdots & 1 \end{bmatrix} \begin{bmatrix} (Vr(0) - Vt(0))^2 \\ (Vr(1) - Vt(1))^2 \\ \vdots \\ (Vr(i) - Vt(i))^2 \end{bmatrix} \quad \text{Formula 4}$$

Wherein the Diff(i) indicates a dissimilarity of the ith color element, the Vr(i) indicates the ith color element value of the query image data, and the Vt(i) indicates the ith color element value of the object image data.

On the other side, when the weight is compensated by the chroma or hue, the similarity is measured using different matrixes according to the weight value as expressed by the following formula 5 (Step S64).

$$\begin{bmatrix} Diff(0) \\ Diff(1) \\ \vdots \\ Diff(i) \end{bmatrix} = \begin{bmatrix} w0 & 0 & \cdots & 0 \\ 0 & w1 & \cdots & 0 \\ \vdots & \vdots & \vdots & \vdots \\ 0 & 0 & \cdots & wI \end{bmatrix} \begin{bmatrix} (Vr(0) - Vt(0))^2 \\ (Vr(1) - Vt(1))^2 \\ \vdots \\ (Vr(i) - Vt(i))^2 \end{bmatrix} \quad \text{Formula 5}$$

$$= [w0, w1, \ldots wI] Ii \begin{bmatrix} (Vr(0) - Vt(0))^2 \\ (Vr(1) - Vt(1))^2 \\ \vdots \\ (Vr(i) - Vt(i))^2 \end{bmatrix}$$

Wherein the Diff(i) indicates a dissimilarity of the ith color element, the Vr(i) indicates the ith color element value of the query data, the Vt(i) indicates the ith color element value of the object data, and the Wi indicates the weight of the ith color element.

When the measurement of the similarity is finished, it is determined that the next object image (the next image to be retrieved) exists (Step S65).

If the next object image (the next image to be retrieved) exists, the next object image is selected and the above steps (S61 to S64) are performed repeatedly.

After that, when the above steps (S60 to S65) in connection with all object images are finished, an arrangement step is performed.

In the arrangement step, the object images are arranged in higher order in the similarity on the basis of the measured similarity (Step S66), and thus the retrieval is finished.

Figure 7:
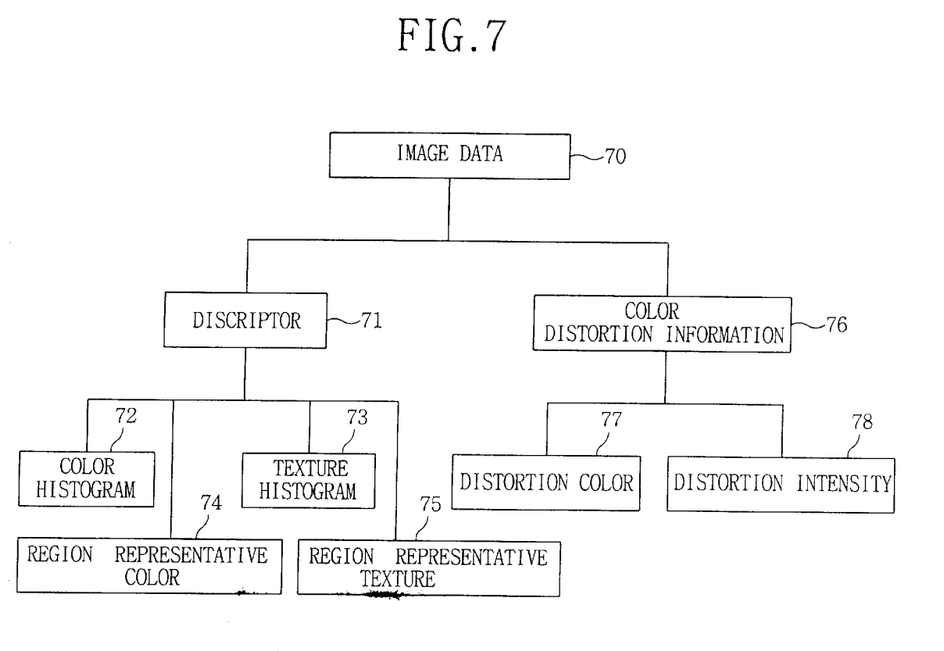
FIG. 7 is a view of image data for embodying the multimedia data retrieval using color distortion information.

FIG. 7 is a view of image data for embodying the multimedia retrieval using the color distortion information. A method for generating image data for embodying the multimedia retrieval using the color distortion information will be described in detail as follows.

As shown in FIG. 7, the image data 70 is generated by defining the color histogram 72, the region representative color information 74, the texture histogram 73 and the region representative texture information 75 as the descriptor 71 for multimedia retrieval.

The image data 70 further defines and generates the color distortion information 76 for retrieving the multimedia data by extracting color distortion information from multimedia data besides the four descriptors 72 to 75 and automatically setting the weight of the descriptor group according to the extracted color distortion information.

The color distortion information 76 defines and generates the distortion color information 77 describing what color has an influence on the color distortion, and defines and generates the intensity 78 of the color distortion information describing the intensity of how much does the distortion color 77 have an influence.

Meanwhile, the present invention may be executed in various ways, namely, the present invention may contain one or both of the intensity of the color distortion information and the distortion color information as the color distortion information. Moreover, the present invention is not restricted by the above embodiments and may be changed in variable ways.

As previously described, when automatically setting the weight using the color distortion information and retrieves multimedia using the weight, the present invention can prevent the deterioration of the retrieval performance caused by the distortion of image color by the inserted color distortion information viewed in the light of the characteristics of the illumination and the device.

Furthermore, because providing algorithm capable of automatically setting the weight of the descriptor, the present invention allows a user to effectively retrieve without effort.

Moreover, in place of not using the color information when the color information is distorted or of reducing the weight regularly, the present invention calculates the distortion sensitivity of even the same color information and sets the most suitable weight, thereby providing a higher retrieval performance.

Additionally, the present invention can prevent errors, such as excessive compensation or non-compensation, that may occur when the distorted color is compensated.

What is claimed is:

1. A content-based multimedia retrieval method, comprising the steps of:
   extracting color distortion information from multimedia data;
   setting weight of a descriptor used in the content-based multimedia retrieval using the extracted color distortion information; and
   retrieving multimedia data applying the weight.

2. The method as claimed in claim 1, wherein the step of setting weight includes a further step of setting weight of elements of the descriptor.

3. The method as claimed in claim 1, wherein the descriptors are color histogram, region representative color information, texture histogram and region representative texture information.

4. The method as claimed in claim 2, wherein the elements of the descriptor are bins constituting the color histogram.

5. The method as claimed in claim 2, wherein the weight is set according to distortion sensitivity of the descriptor or the element of the descriptor.

6. The method as claimed in claim 5, wherein the weight is applied low to the descriptor or the element of the descriptor, as the distortion sensitivity is large.

7. The method as claimed in claim 6, wherein the distortion sensitivity is determined in an inverse proportion to an average similarity, wherein the average similarity is obtained by calculating and averaging similarities of data containing the color distortion information and data not containing the color distortion information based on the corresponding descriptor or element of the descriptor.

8. The method as claimed in claim 6, wherein the distortion sensitivity is in proportion to the extent of reliance on color information out of the color-based descriptors.

9. The method as claimed in claim 2, wherein, of the color-based descriptors used in the retrieval, the weight of the descriptor having relatively large distortion sensitivity is set to be lower than the weight of the other descriptors.

10. The method as claimed in claim 2, wherein the descriptor or the element of the descriptor is divided into a color-based descriptor group and a non-color-based descriptor group, wherein the weight of the color-based descriptor group is set to be lower than the non-color-based descriptor group.

11. The method as claimed in claim 10, wherein the weight is set according to the distortion sensitivity of the color-based descriptor group and the non-color-based descriptor group.

12. The method as claimed in claim 11, wherein the color-based descriptor group is the color histogram and the region representative color information, and the non-color-based descriptor group is the texture histogram and the region representative texture information.

13. The method as claimed in claim 12, wherein, of the color-based descriptor group, if the distortion sensitivity of the color histogram is larger than that of the region representative color, the weight of the color histogram is set to be relatively lower than that of the region representative color.

14. The method as claimed in claim 1, wherein the color distortion information is an intensity value of the color distortion information, or a color value of the color distortion information, or a combination of the values.

15. The method as claimed in claim 14, wherein the color value of the color distortion information is hue.

16. The method as claimed in claim 1, wherein, of the color elements used in the color-based descriptor, the weight of the color element having relatively low chroma is set to be lower than that of the color element having high chroma.

17. The method as claimed in claim 1, wherein, of the color elements used in the color-based descriptor, the weight of color region having the hue different from that of the color distortion information is set to be low.

18. A color distortion information extracting method, comprising the steps of:
    dividing an image into partial regions of N×M;
    calculating, with respect to all divided partial regions, average hue values of pixels that their chroma is lower than a predetermined threshold for each partial region, and variance of hue values of pixels applied to the average hue values; and
    re-averaging the average hue values obtained in each partial region with respect to the partial regions in which the calculated variance is lower than the predetermined threshold.

19. The method as claimed in claim 18, wherein a ratio that the regions applied to the re-average of the hue value and of lower than the predetermined threshold occupy in whole image is designated as an intensity of the color distortion information.

20. The method as claimed in claim 18, wherein the re-averaged average hue values are designated as the hue value of the color distortion information.

21. A distortion sensitivity extracting method, comprising the steps of:
    calculating a similarity based on a descriptor or an element of the descriptor with respect to the same image data in a data sample group that a color distortion does not occur and in a data sample group that the color distortion occurs;
    obtaining an average value of the calculated similarities; and
    determining a distortion sensitivity in inverse proportion to the average similarity.

22. In a content-based multimedia data retrieval using a descriptor such as a color histogram of image, a multimedia data information generating method, comprising the steps of:
    generating a descriptor group having one or more descriptors used in the multimedia data retrieval; and
    extracting color distortion information from the multimedia data, automatically setting weight of the descriptor group according to the extracted color distortion information, and generating color distortion information for retrieving the multimedia data.

23. The method as claimed in claim 22, wherein the color distortion information consists of an intensity of the color distortion information, hue information of the color distortion information, or the combination of the intensity and hue information.

24. The method as claimed in claim 22, wherein the color distortion information describes what color has affected the color distortion.

25. The method as claimed in claim 23, wherein the intensity of the color distortion information describes how much the distorted color has affected.

* * * * *